US012688988B2

(12) United States Patent
Li et al.

(10) Patent No.: US 12,688,988 B2
(45) Date of Patent: Jul. 21, 2026

(54) SWITCH

(71) Applicant: Schneider Electric (China) Co., Ltd., Beijing (CN)

(72) Inventors: Xiaoqiang Li, Shanghai (CN); Meng Du, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 195 days.

(21) Appl. No.: 18/516,470

(22) Filed: Nov. 21, 2023

(65) Prior Publication Data

US 2025/0054717 A1 Feb. 13, 2025

(51) Int. Cl.
*H01H 50/18* (2006.01)
*H01H 50/36* (2006.01)

(52) U.S. Cl.
CPC ............ *H01H 50/18* (2013.01); *H01H 50/36* (2013.01)

(58) Field of Classification Search
CPC ........ H01H 50/18; H01H 50/36; H01H 50/42; H01H 50/546; H01H 51/27; H01F 2007/1669; H01F 7/081; H01F 7/1615
USPC .......................................................... 335/166
See application file for complete search history.

(56) References Cited

U.S. PATENT DOCUMENTS 3,040,217 A * 6/1962 Conrad ................ H01F 7/1615 335/254
4,157,520 A * 6/1979 Moates .................... H02H 3/34 335/229
5,127,585 A * 7/1992 Mesenich ............ H01F 7/1615 239/585.5
5,611,370 A * 3/1997 Najmolhoda ......... F16K 31/062 251/129.08
6,242,994 B1 * 6/2001 Li .......................... H01F 7/088 335/277
9,530,552 B1 * 12/2016 Shen .................. F16K 31/0606
2004/0025949 A1 * 2/2004 Wygnaski ............ F16K 31/082 137/66
2004/0201441 A1 * 10/2004 Elendt .................. H01F 7/1615 335/179
2007/0138422 A1 * 6/2007 Najmolhoda ......... F16K 31/082 251/129.14

(Continued)

FOREIGN PATENT DOCUMENTS

CN 105161372 A 12/2015
DE 102014117491 A1 * 6/2016 ............ H01H 89/08
JP S596503 A 1/1984

*Primary Examiner* — Shawki S Ismail
*Assistant Examiner* — Lisa N Homza
(74) *Attorney, Agent, or Firm* — Kinney & Lange, P.A.

(57) ABSTRACT

A switch is disclosed, including: a static contact; a static iron core; a moving iron core including a narrow part passing through the first opening of the cavity and a widened part immediately adjacent to the narrow part and away from the static contact relative to the narrow part, and the moving iron core passes through the cavity through the first opening and the second opening of the cavity; a moving contact fixedly arranged on the moving iron core, wherein the platform abuts against the static iron core when the moving contact is in contact with the static contact; a coil arranged in the cavity; a reset piece connected to the moving iron core, wherein the reset piece exerts an elastic force on the moving iron core away from the static contact when the static contact is in contact with the moving contact.

12 Claims, 2 Drawing Sheets

(56) References Cited

U.S. PATENT DOCUMENTS

| | | | | |
|---|---|---|---|---|
| 2010/0164662 | A1* | 7/2010 | Sohn | H01F 7/1615 335/274 |
| 2010/0165535 | A1* | 7/2010 | Pohl | H01F 7/1615 361/160 |
| 2014/0104020 | A1* | 4/2014 | Beyer | H01F 7/1615 335/234 |
| 2015/0061798 | A1* | 3/2015 | Seid | H01F 7/121 335/229 |
| 2015/0337981 | A1* | 11/2015 | Miller | H01F 7/1615 251/65 |
| 2016/0035502 | A1 | 2/2016 | Zhong et al. | |
| 2016/0133404 | A1* | 5/2016 | Zhong | H01H 50/546 335/201 |
| 2016/0336133 | A1 | 11/2016 | Fukuda et al. | |
| 2017/0345585 | A1* | 11/2017 | Lang | H01H 1/2008 |
| 2020/0041023 | A1* | 2/2020 | Goers | F16K 31/0627 |

* cited by examiner

SWITCH

CROSS-REFERENCE TO RELATED APPLICATIONS

This application claims benefit of priority from China Utility Model Application Serial No. 202322111398.3 filed Aug. 7, 2023, the content of which is incorporated by reference herein in its entirety.

TECHNICAL FIELD

The present disclosure relates to a switch, in particular to an automatic on-off switch.

BACKGROUND

In most designs of the automatic on-off switches, when a switch needs to be closed, the coil is energized to magnetize the iron core, so that the moving iron core is attracted by the static iron core to move, thus driving the moving contact arranged on the moving iron core to contact with the fixedly arranged static contact, and then the circuit is closed and conducted; when the switch needs to be open, the coil is de-energized so that the iron core is no longer magnetic and no longer attracted by the static iron core, and the moving iron core returns to the initial position through the restoring force of a elastic component, thus driving the moving contact arranged on the moving iron core to be separated from the fixedly arranged static contact, and further opening the circuit.

In order to maintain the closed state of the circuit, the coil needs to be energized all the time, which not only increases energy consumption, but also increases the risk of failure. Therefore, the present disclosure proposes an improved switch, which overcomes the defects of the above-mentioned prior art.

SUMMARY

According to a first aspect of the present disclosure, a switch is provided, which includes: a static contact; a static iron core partially forming a cavity, wherein the cavity has a first opening on a side facing the static contact and a second opening on a side away from the static contact, and the size of the first opening is smaller than that of the second opening; a moving iron core, wherein the moving iron core includes a narrow part passing through the first opening of the cavity and a widened part immediately adjacent to the narrow part and away from the static contact relative to the narrow part, wherein the cross-sectional size of the narrow part is smaller than that of the widened part, and a platform is formed at the boundary between the narrow part and the widened part and protruding outwards from the periphery of the narrow part, and the moving iron core passes through the cavity through the first opening and the second opening of the cavity; a moving contact fixedly arranged on the moving iron core, wherein the platform abuts against the static iron core when the moving contact is in contact with the static contact; a coil arranged in the cavity and surrounding a part of the moving iron core; a permanent magnet arranged in the cavity and adjacent to the coil; a reset piece connected to the moving iron core, wherein the reset piece exerts an elastic force on the moving iron core away from the static contact when the static contact is in contact with the moving contact.

According to this solution, when the switch is closed by the contact between the static contact and the moving contact, the moving iron core and the static iron core attractively adhere together under the magnetization of the permanent magnet, not necessarily under the magnetization of the energized coil, so that the coil does not have to be energized all the time, which not only reduces the energy consumption, but also improves the stability and service life of the switch.

In some solutions, the permanent magnet is in contact with the static iron core, and when the moving contact is in contact with the static contact, the permanent magnet is in contact with the moving iron core.

According to this solution, when the switch is closed, there is no gap between the permanent magnet and the moving iron core and the static iron core, so that the permanent magnet, the moving iron core and the static iron core form a closed magnetic circuit, which increases the magnetic field intensity at the attractive adhering region between the moving iron core and the static iron core, so that the attractive adherence between the moving iron core and the static iron core is firmer, and thus the closed state of the circuit is more stable.

In some solutions, the moving iron core passes through the static iron core along the center line of the static iron core.

According to this solution, the moving iron core and the static iron core have roughly symmetrical structures, which are easy to manufacture and beneficial for mechanical balance.

In some solutions, the permanent magnet includes a first permanent magnet and a second permanent magnet, which are oppositely arranged about the center line and spaced apart. The magnetic poles of the respective ends of the first permanent magnet and the second permanent magnet facing the moving iron core are the same. When the static contact is in contact with the moving contact, the first permanent magnet and the second permanent magnet are in contact with the moving iron core respectively.

According to this solution, the first permanent magnet, the static iron core and the moving iron core form a closed first magnetic circuit, and the second permanent magnet, the static iron core and the moving iron core form a closed second magnetic circuit, and through the arrangement of the magnetic poles, the magnetic fields of the first magnetic circuit and the second magnetic circuit are superimposed on each other at the attractive adhering region between the moving iron core and the static iron core, so that the attractive adherence between the moving iron core and the static iron core is firmer and thus the closed state of the circuit is more stable.

In some solutions, the permanent magnet can be arranged on the side of the coil near or away from the static contact.

In some solutions, the static iron core is provided with a protruding part at the first opening and protruding towards the interior of the static iron core in a direction parallel to the center line of the static iron core, and when the moving contact is in contact with the static contact, the platform abuts against the protruding part.

According to this solution, through the better adherence between the protruding part and the platform, the attractive adherence between the moving iron core and the static iron core is firmer, and thus the closed state of the circuit is more stable.

In some solutions, the protruding part may be made of a ferromagnetic material.

According to this solution, the permanent magnet, the static iron core, the moving iron core and the protruding part can form a closed magnetic circuit, which increases the magnetic field intensity at the attractive adhering region between the moving iron core and the static iron core, so that the attractive adherence between the moving iron core and the static iron core is firmer, and thus the closed state of the circuit is more stable.

In some solutions, a permanent magnet can be arranged on a side of the coil near the static contact, and the position of the permanent magnet is set so that when the static contact is in contact with the moving contact, the side surface of the permanent magnet near the static contact is flush with the platform of the moving iron core.

In some solutions, the widened part and the narrow part can be integrally formed and made of a magnetic conductive material.

In some solutions, the moving iron core may include an outer part and an inner part. The inner part continuously extends through the cavity and has the same cross-sectional size as the narrow part, and the outer part surrounds a part of the inner part to form the widened part. The outer part is made of a magnetic conductive material.

In some solutions, the reset piece may be a spring.

In some solutions, one end of the reset piece is fixed and the other end the reset piece is connected to an end of the moving iron core facing the static contact, and when the moving contact is in contact with the static contact, the spring is in a compressed state.

In some solutions, the moving iron core is provided with an accommodating part near the moving contact, and a contact spring is arranged in the accommodating part. One end of the contact spring is connected with the moving contact, and the other end of the contact spring is fixed to the moving iron core.

According to this solution, after the moving contact and the static contact start to contact, the moving contact can keep moving in the accommodating part and compressing the contact spring, which ensures a certain contact pressure and thus ensuring good contact of the switch.

Figure 1:
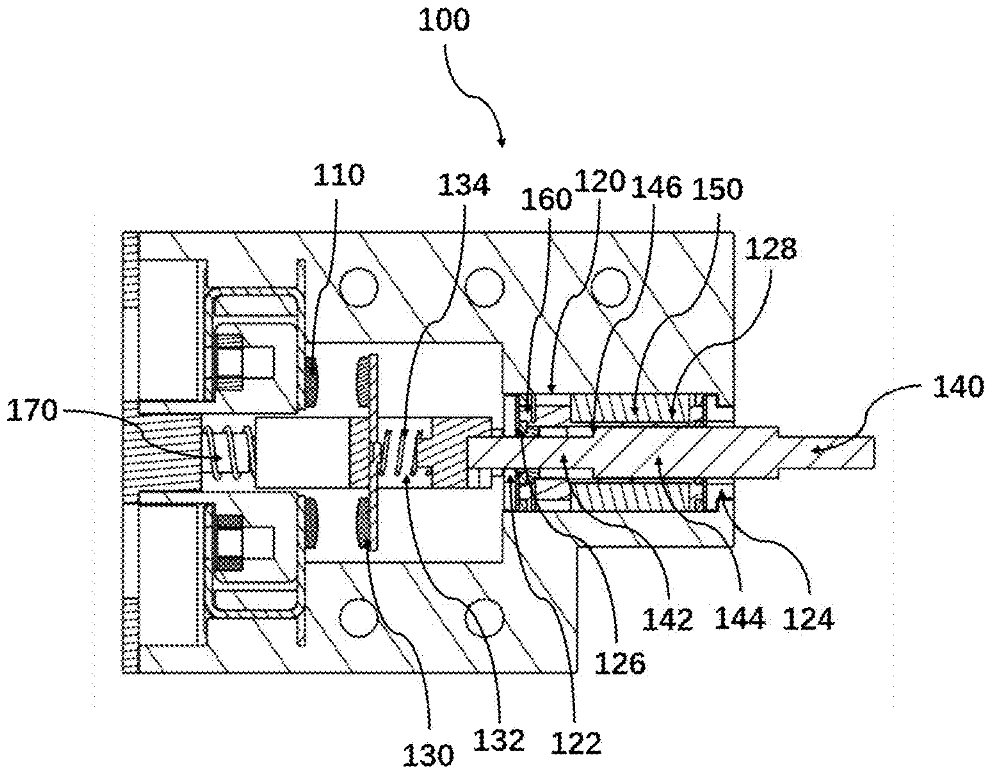
FIG. 1 shows a schematic diagram of a switch according to a first embodiment of the present disclosure in an open state.

Reference numerals: 100 switch, 110 static contact, 120 static iron core, 122 first opening, 124 second opening, 126 protruding part, 128 cavity, 130 moving contact, 132 accommodating part, 134 contact spring, 140 moving iron core, 142 narrow part, 144 widened part, 146 platform, 150 coil, 160 permanent magnet, 162 first permanent magnet, 164 second permanent magnet, 170 reset piece.

DETAILED DESCRIPTION OF THE EMBODIMENTS

In order to make the purpose, solution and advantages of the technical solution of the present disclosure clearer, the technical solution of the embodiments of the present disclosure will be described clearly and completely in combination with the attached drawings of the specific embodiments of the present disclosure. Unless otherwise specified, the terms used herein have the ordinary meaning in the art. In the drawings, the same reference numerals represent the same parts.

FIG. 1 shows a schematic diagram of a switch 100 according to a first embodiment of the present disclosure in an open state. The switch 100 mainly includes a static contact 110, a moving contact 130, a static iron core 120, a moving iron core 140 and a coil 150, and the closing or opening of the switch 100 is controlled by the engagement or separation of the static contact 110 and the moving contact 130. The static contact 110 remains fixed, and the contact state between the static contact 110 and the moving contact 130 is controlled by the movement of the moving contact 130, which is partly controlled by the magnetic field generated by the energization of the coil 150.

Specifically, the static iron core 120 partially surrounds and forms a cavity 128, and the cavity 128 has a first opening 122 on the side facing towards the static contact 110 and a second opening 124 on the side away from the static contact 110. The size of the first opening 122 is smaller than that of the second opening 124. The moving iron core 140 includes a narrow part 142 passing through the first opening 122 of the cavity 128 and a widened part 144 immediately adjacent to the narrow part 142 and away from the static contact 110 relative to the narrow part 142. The cross-sectional size of the narrow part 142 is smaller than that of the widened part 144. A protruding platform 146 is formed at the boundary between the narrow part 142 and the widened part 144. The moving iron core 140 passes through the cavity 128 through the first opening 122 and the second opening 124. The moving contact 130 is fixedly arranged to the moving iron core 140, and when the moving contact 130 is in contact with the static contact 110, the platform 146 abuts against the static iron core 120. The coil 150 is arranged in the cavity 128 and surrounds a part of the moving iron core 140. When the coil 150 is energized, the moving iron core 140 is magnetized to have magnetism.

Figure 2:
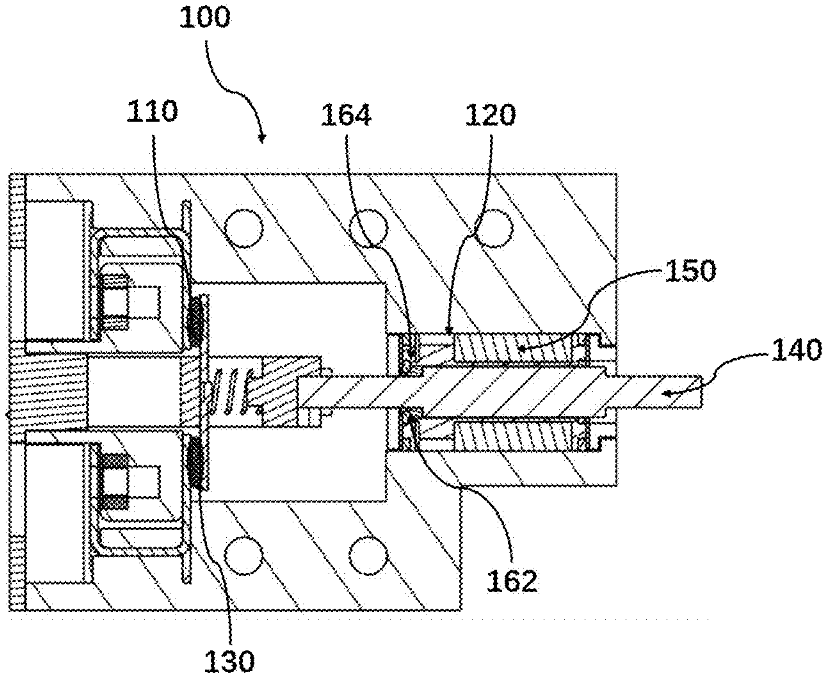
FIG. 2 shows a schematic diagram of a switch according to the first embodiment of the present disclosure in a closed state.
Figure 3:
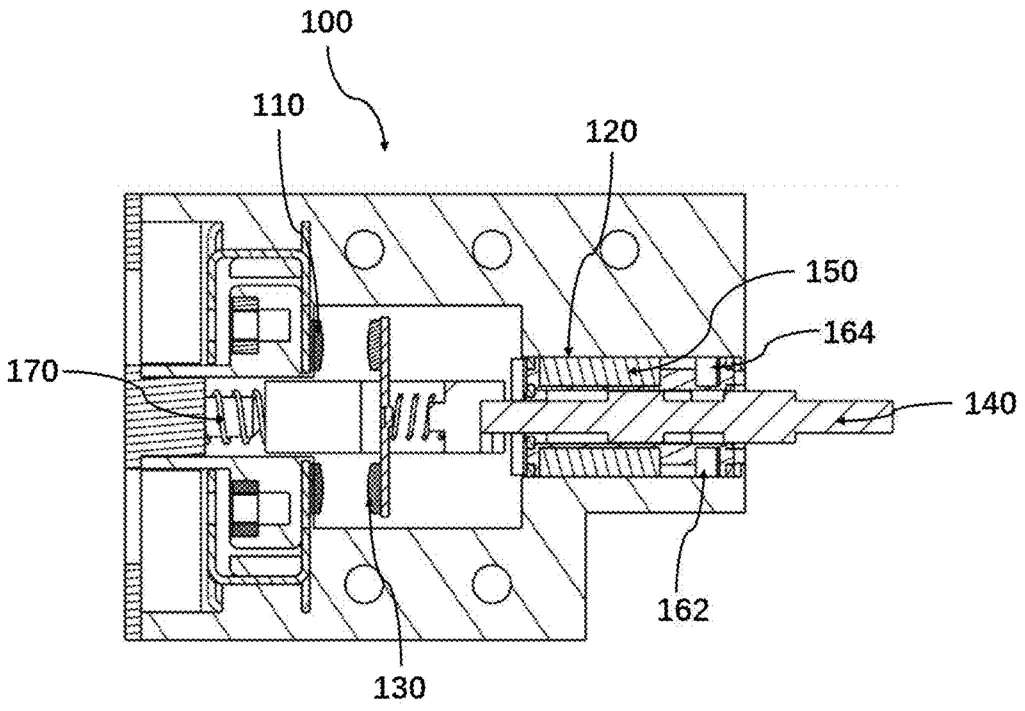
FIG. 3 shows a schematic diagram of a switch according to a second embodiment of the present disclosure in an open state.
Figure 4:
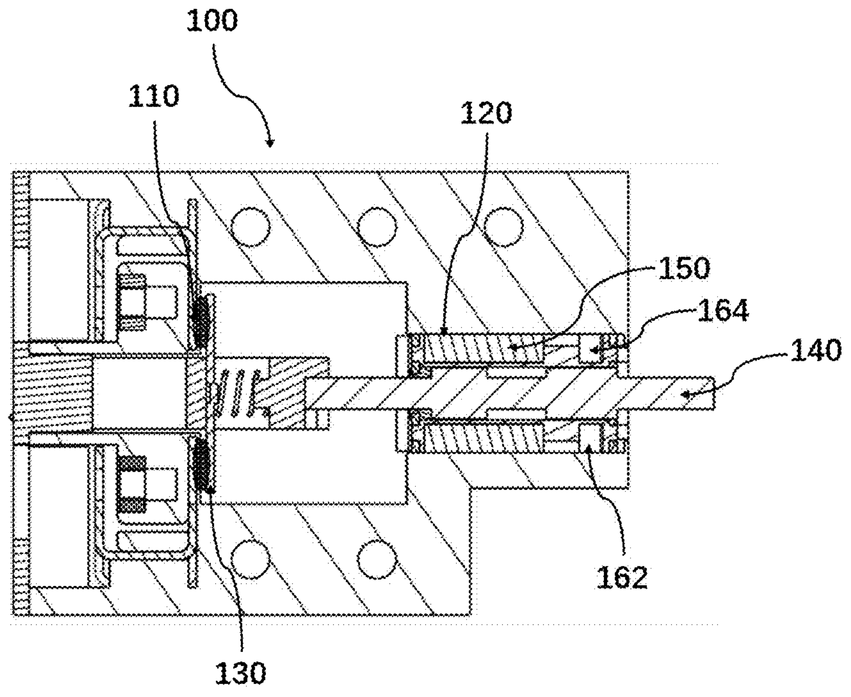
FIG. 4 shows a schematic diagram of a switch according to the second embodiment of the present disclosure in a closed state.

When the switch 100 needs to be closed, energizing the coil 150 makes the moving iron core 140 magnetized and magnetic, and the moving iron core 140 moves towards the static contact 110 under the action of the magnetic field force until the moving contact 130 contacts the static contact 110 to close the switch 100 (as shown in FIG. 2 or 4). When the switch 100 needs to be open, the moving iron core 140 is no longer magnetic and is not affected by the magnetic field force by deenergizing the coil 150. At this time, the moving iron core 140 moves away from the static contact 110 under the elastic force of the reset piece 170 (for example, the reset piece 170 can be a spring), so that the moving contact 130 is separated from the static contact 110, thus opening the switch 100 (as shown in FIG. 1 or 3). Under the above-described traditional configuration, when the switch 100 is in the closed state, it is required that the coil 150 is always energized, which not only increases the energy consumption but also increases the risk of failure.

Therefore, the present disclosure improves the above-mentioned configuration by arranging a permanent magnet 160 in the cavity 128 near the coil 150. The permanent magnet 160 makes the moving iron core 140 magnetized and magnetic, so that the moving iron core 140 is subjected to the magnetic field force towards the static contact 110, so that when the switch 100 is in the closed state, the switch 100 can be stabilized in the closed state without energizing the coil 150. In other words, when the switch 100 is in the closed state, the magnetic field generated by the permanent magnet 160 replaces the magnetic field generated by the energization of the coil 150, so that the coil 150 does not have to be energized all the time to maintain the switch 100 closed. Through such a configuration, the energy consumption is reduced and the risk of failure is also reduced. Optionally, the permanent magnet 160 may be arranged on a side of the coil 150 close to (as shown in FIG. 1 or 2) or away from (as shown in FIG. 3 or 4) the static contact 110.

Under this configuration, when the switch 100 needs to be closed, it is only necessary to temporarily energize the coil 150, and the moving iron core 140 moves towards the static contact 110 under the action of the magnetic field generated by the coil 150. When the moving iron core 140 moves to close the switch 100, the platform 146 abuts against the static iron core 120, and at this time, the platform 146 and the static iron core 120 are in a magnetic field environment generated by the permanent magnet 160 and closely adhere to each other. Therefore, the magnetic field generated by energizing the coil 150 is no longer needed. That is to say, the coil 150 can be deenergized. When the switch 100 needs to be opened, it is only necessary to temporarily flow a reverse current in the coil 150. The magnetic field generated by the reverse current at least partially cancels the magnetic field generated by the permanent magnet 160 where the platform 146 and the static iron core 120 contact, so that the magnetic attraction between the moving iron core 140 and the static iron core 120 decreases, causing the moving iron core to move away from the static contact 110 under the elastic force of the reset piece 170, so that the moving contact 130 is separated from the static contact 110, thus opening the switch 100. In short, when the switch 100 needs to be closed, the coil 150 is energized to provide power for the moving iron core 140 to start moving. When the moving iron core 140 has moved to the position where the switch 100 is closed, energizing the coil 150 is no longer required to maintain the position of the moving iron core 140, and the permanent magnet 160 replaces the energized coil 150 to maintain the position of the moving iron core 140.

Preferably, the permanent magnet 160 is in contact with the static iron core 120, and when the moving contact 130 is in contact with the static contact 110, the permanent magnet 160 is in contact with the moving iron core 140. In this way, when the switch 100 is closed, there is no gap between the permanent magnet 160 and the moving iron core 140 and the static iron core 120, so that the permanent magnet 160, the moving iron core 140 and the static iron core 120 form a closed magnetic circuit, which increases the magnetic field intensity at the adhering region of the moving iron core 140 and the static iron core 120 (that is, at the platform 146), and makes the attractive adherence of the moving iron core 140 and the static iron core 120 firmer, thus making closed state of the switch 100 more stable.

Preferably, the moving iron core 140 passes through the static iron core 120 along the center line of the static iron core 120, and the permanent magnet 160 includes a first permanent magnet 162 and a second permanent magnet 164. The first permanent magnet 162 and the second permanent magnet 164 are oppositely arranged and spaced apart, and the magnetic poles of the respective ends of the first permanent magnet 162 and the second permanent magnet 164 facing towards the moving iron core 140 are the same. When the static contact 110 is in contact with the moving contact 130, the first permanent magnet 162 and the second permanent magnet 164 are in contact with the moving iron core 140 respectively. In this way, the first permanent magnet 162, the static iron core 120 and the moving iron core 140 form a closed first magnetic circuit, and the second permanent magnet 164, the static iron core 120 and the moving iron core 140 form a closed second magnetic circuit, and through the arrangement of magnetic poles, the magnetic fields of the first magnetic circuit and the second magnetic circuit are superimposed and enhanced at the attractive adhering region of the moving iron core 140 and the static iron core 120 (that is, at the platform 146), so that the attractive adherence between the moving iron core 140 and the static iron core 140 are firmer, thus the closed state of the switch 100 is more stable.

Preferably, the static iron core 120 is provided with a protruding part 126 at the first opening 122 and protruding towards the interior of the static iron core 120 in a direction parallel to the center line of the static iron core 120. When the moving contact 130 is in contact with the static contact 110, and the platform 146 abuts against the protruding part 126. Through the better adherence between the protruding part 126 and the platform 146, the attractive adherence between the moving iron core 140 and the static iron core 120 is firmer, so that the closed state of the switch 100 is more stable.

Preferably, the protruding part 126 can be made of ferromagnetic material. In this way, the permanent magnet 160, the static iron core 120, the moving iron core 140 and the protruding part 126 can form a closed magnetic circuit, which increases the magnetic field intensity at the attractive adhering region between the moving iron core 140 and the static iron core 120, making the attractive adherence between the moving iron core 140 and the static iron core 120 firmer, so that the closed state of the switch 100 is more stable. The protruding part 126 can be fixed to the static iron core 120 by welding, riveting or any other suitable way. The present disclosure does not intend to limit the way of fixing between the protruding part 126 and the static iron core 120.

Optionally, one end of the reset piece 170 is fixed and the other end is connected to an end of the moving iron core 140 facing the static contact 110, and when the moving contact 130 is in contact with the static contact 110, the spring 170 is in a compressed state.

Optionally, the moving iron core 140 is provided with an accommodating part 132 near the moving contact 130, and a contact spring 134 is arranged in the accommodating part 132. One end of the contact spring 134 is connected with the moving contact 130, and the other end of the contact spring 134 is fixed to the moving iron core 140. In this way, after the moving contact 140 starts to be in contact with the static contact 120, the moving contact 140 can keep moving in the accommodating part 132 and compressing the contact spring 134, which ensures a certain contact pressure, thus ensuring good contact of the switch 100.

Several exemplary embodiments of the present disclosure are described in detail herein with reference to preferred embodiments. However, those skilled in the art can understand that various variations and modifications can be made to the above specific embodiments without departing from the concept of the present disclosure, and various technical features and structures proposed by the present disclosure can be combined without exceeding the protection scope of the disclosure, which is determined by the appended claims.

What is claimed is:

1. A switch comprising:

a static contact;

a static iron core partially forming a cavity, wherein the cavity has a first opening on a side facing the static contact and a second opening on a side away from the static contact;

a moving iron core, wherein the moving iron core comprises a narrow part passing through the first opening of the cavity and a widened part immediately adjacent to the narrow part and away from the static contact relative to the narrow part, wherein a cross-sectional size of the narrow part is smaller than that of the widened part, and a platform is formed at a boundary between the narrow part and the widened part and protruding outwards from a periphery of the narrow part, and the moving iron core passes through the cavity through the first opening and the second opening of the cavity;

a moving contact fixedly arranged on the moving iron core, wherein the platform abuts against the static iron core when the moving contact is in contact with the static contact;

a coil arranged in the cavity and surrounding a part of the moving iron core;

a permanent magnet arranged in the cavity and adjacent to the coil;

a reset piece connected to the moving iron core, wherein the reset piece exerts an elastic force on the moving iron core away from the static contact when the static contact is in contact with the moving contact, wherein the static iron core, the moving iron core and the permanent magnet form a closed magnetic circuit when the static contact is in contact with the moving contact.

2. The switch according to claim 1, wherein there is no air gap between the permanent magnet and the static iron core, and there is no air gap between the permanent magnet and the moving iron core when the moving contact is in contact with the static contact.

3. The switch according to claim 2, wherein the moving iron core passes through the static iron core along a center line of the static iron core.

4. The switch according to claim 3, wherein the permanent magnet comprises a first permanent magnet and a second permanent magnet, the first permanent magnet and the second permanent magnet are oppositely arranged with respect to the center line and spaced apart, and magnetic poles of respective ends of the first permanent magnet and the second permanent magnet facing the moving iron core are the same, and when the static contact is in contact with the moving contact, the first permanent magnet and the second permanent magnet are in contact with the moving iron core respectively.

5. The switch according to claim 4, wherein the permanent magnet is arranged on a side of the coil near or away from the static contact.

6. The switch according to claim 4, wherein the static iron core is provided with a protruding part at the first opening and protruding towards an interior of the static iron core in a direction parallel to the center line of the static iron core, and when the moving contact is in contact with the static contact, the platform abuts against the protruding part.

7. The switch according to claim 6, wherein the protruding part is made of a ferromagnetic material.

8. The switch according to claim 4, wherein the permanent magnet is arranged on a side of the coil near the static contact, and the position of the permanent magnet is set so that when the static contact is in contact with the moving contact, a side surface of the permanent magnet near the static contact is flush with the platform of the moving iron core.

9. The switch according to claim 1, wherein the widened part and the narrow part are integrally formed and are made of a magnetic conductive material.

10. The switch according to claim 1, wherein the moving iron core comprises an outer part and an inner part, wherein the inner part continuously extends through the cavity and has a same cross-sectional size as that of the narrow part, the outer part surrounds a part of the inner part to form the widened part, and the outer part is made of a magnetic conductive material.

11. The switch according to claim 1, wherein the reset piece is a spring, one end of the reset piece is fixed and the other end of the reset piece is connected to an end of the moving iron core facing the static contact, and when the moving contact is in contact with the static contact, the spring is in a compressed state.

12. The switch according to claim 1, wherein the moving iron core is provided with an accommodating part near the moving contact, and a contact spring is arranged in the accommodating part, and one end of the contact spring is connected with the moving contact and the other end of the contact spring is fixed to the moving iron core.

* * * * *